United States Patent [19]

Whitney

[11] 4,365,148

[45] Dec. 21, 1982

[54] DATA PROCESSING SYSTEM

[75] Inventor: John A. Whitney, Fort Wayne, Ind.

[73] Assignee: Franklin Electric Co., Inc., Bluffton, Ind.

[21] Appl. No.: 270,239

[22] Filed: Jun. 4, 1981

Related U.S. Application Data

[63] Continuation-in-part of Ser. No. 105,149, Dec. 19, 1979, abandoned.

[51] Int. Cl.³ ............................................ G06K 15/02
[52] U.S. Cl. ...................................... 235/383; 177/4; 235/378
[58] Field of Search ....................... 235/378, 383, 385; 177/4; 364/466

[56] References Cited

U.S. PATENT DOCUMENTS 3,961,747 6/1976 Small ...................................... 177/4

*Primary Examiner*—Harold I. Pitts
*Attorney, Agent, or Firm*—Merriam, Marshall & Bicknell

[57] ABSTRACT

This disclosure relates to a system for processing a plurality of random weight commodity packages in a supermarket utilizing a series of labels having nonrepretitive machine readable symbols thereon. The system includes a computer-scale having a data entry unit, a central computer including a memory bank, and a symbol scanner at a checkout station. Commodity-related data including the commodity identification and the price per unit weight are entered into the entry unit, most or all of the data usually being entered manually. The computer-scale includes means for serially weighing the packages, a price computer for computing the total package cost, and a printer for printing human readable data on a label. The system further includes means for applying a machine readable code symbol to each package, the symbol being located either on the above-mentioned label or on a separate label that is also attached to the package. The commodity related data, the weight, the total cost and the code symbol form a group of package-related data, and the data groups for the plurality of packages are transmitted to and stored in the central computer. The code symbols on the packages are scanned as the packages pass the checkout station in order to retrieve the commodity identification and the total cost of each package from the stored data groups. The groups of data may also be withdrawn from the central computer for data analysis purposes.

20 Claims, 5 Drawing Figures

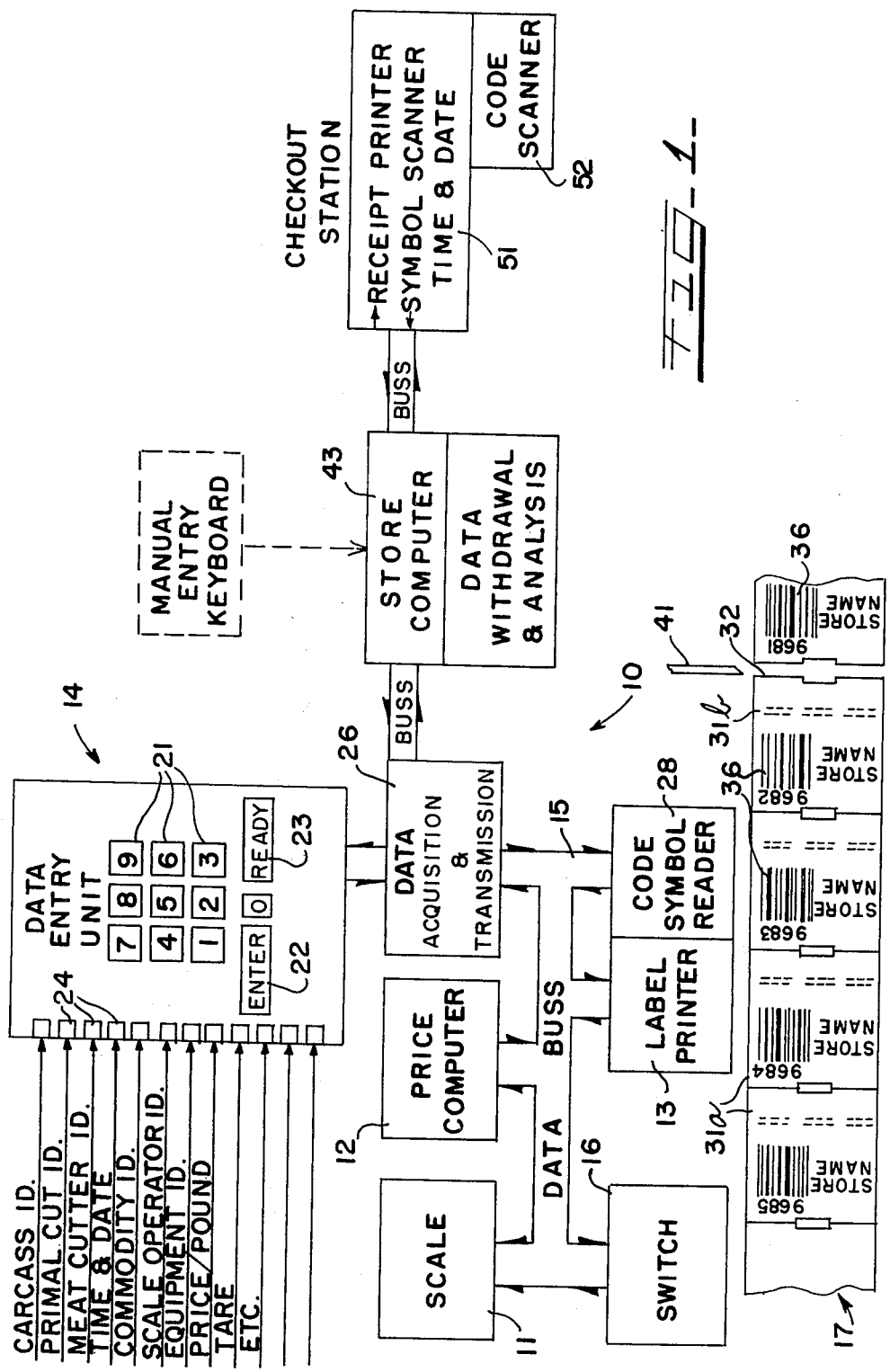

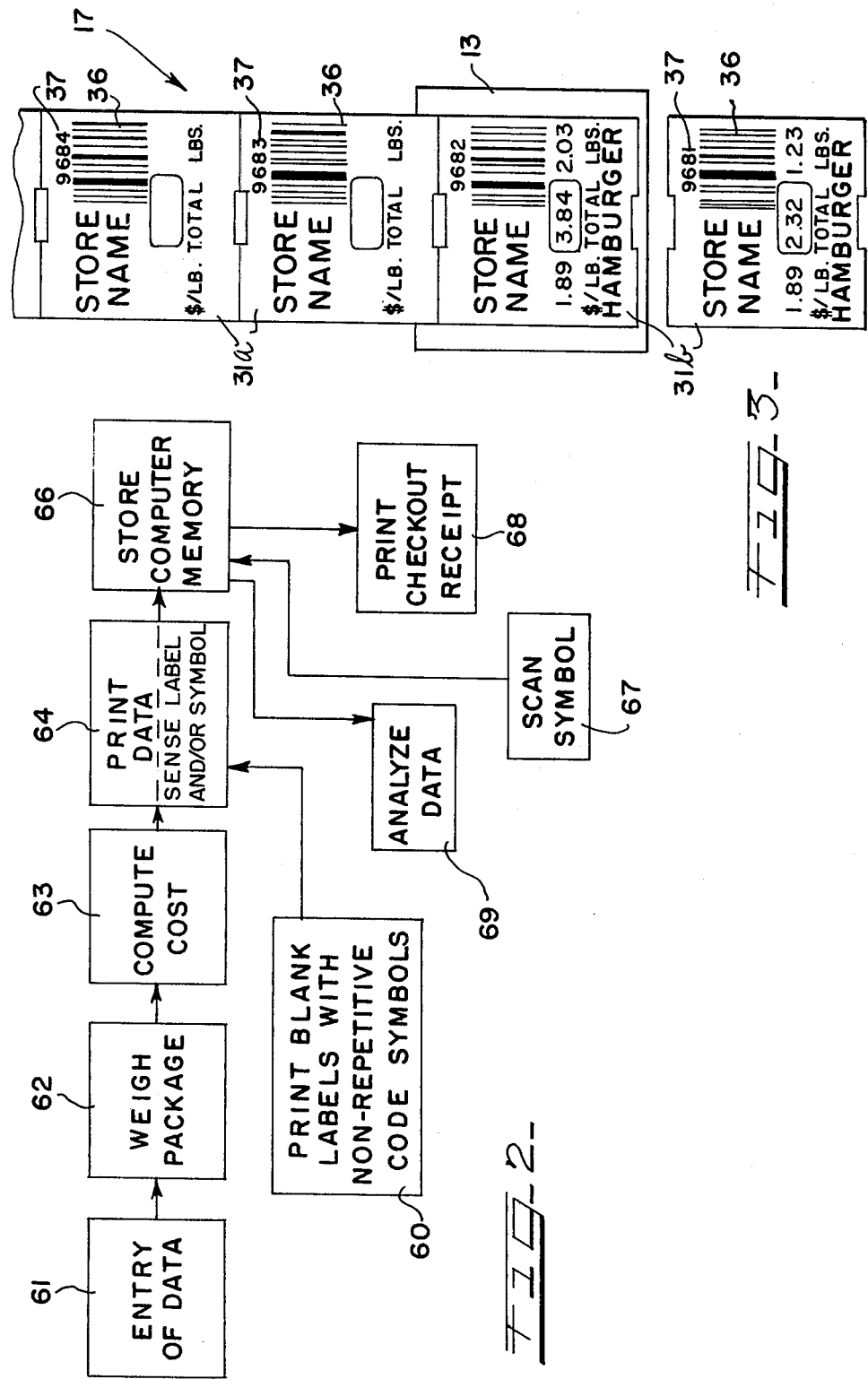

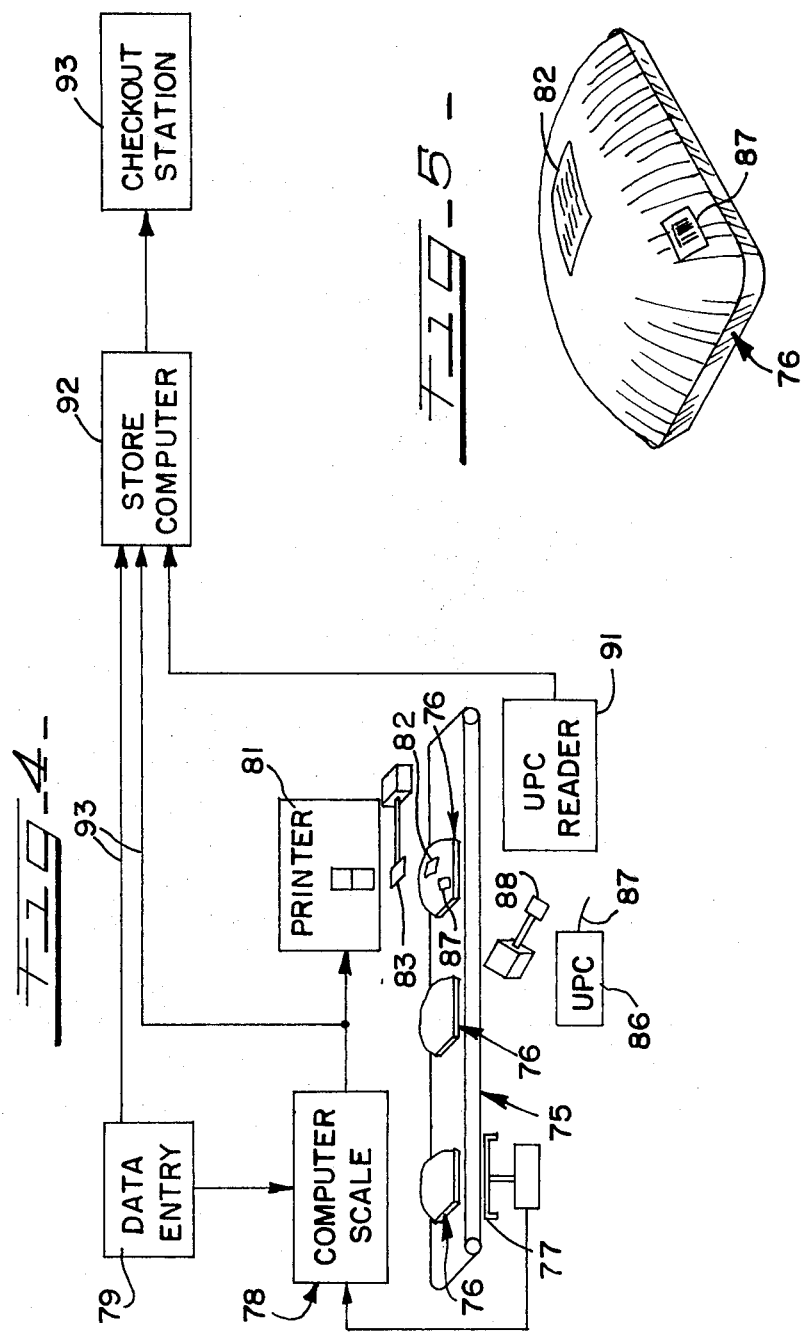

DATA PROCESSING SYSTEM

REFERENCE TO RELATED APPLICATION

This application is a continuation-in-part of my co-pending application Ser. No. 105,149 filed Dec. 19, 1979, now abandoned.

BACKGROUND OF THE INVENTION

In recent years supermarkets have become increasingly automated, and to this end, a machine readable code, such as the universal product code (UPC), or bar code, and a code reader have been developed and used in many supermarkets. The code consists of a series of bars printed on a commodity package or on a label attached to a package, and a scanner, which is normally located at the store checkout station, reads the coded information. The information includes the total cost of the package and, depending on the type of commodity, the name of a manufacturer, and an identification of the commodity.

Proposals have been made to use the bar code in connection with random weight packages, such as with prepackaged meats in a meat display counter and with delicatessen foods. When used with prepackaged meats, it has been proposed to have some of the coded numbers designate the price and the remainder of the numbers identify the product and, perhaps, a department. In such a system, a printer is required at each weighing station, which is capable of printing information both in human readable form and in machine-readable bar code form.

U.S. Pat. No. 3,961,747 discloses a system as described above, that prints a bar code on a label, the code including the commodity price. U.S. Pat. Nos. 3,291,232 and No. 3,459,272 show examples of prior art systems wherein the data are printed in human readable form only. U.S. Pat. No. 3,741,324 shows a computer-scale having a keyboard data entry and decoding system, and apparatus for handling human- and machine readable symbols. U.S. Pat. No. 3,459,271 shows a computer-scale system connected to a central computer.

The proposed arrangements described above have a number of disadvantages. A bar code printer must be provided at each weighing station, and a good quality printer has a high initial cost and frequently a high maintenance cost. Also, and more importantly, in the proposed systems the amount of information capable of being transmitted by a bar code is very limited. For efficient supermarket operation, the management would like to have a large amount of information regarding each package available for analysis, and past proposals have not been able to satisfy this need.

SUMMARY OF THE INVENTION

It is a general object of the present invention to provide an improved apparatus and method which avoid the foregoing disadvantages.

Apparatus in accordance with the present invention is for use in processing a plurality of commodity packages, and utilizes a series of labels having nonrepetitive numbers, or other symbols, preprinted on them in machine readable code form. The apparatus includes data entry-acquisition means which receives commodity-related data including the price per pound, commodity I.D., date, operator I.D., etc. A computer-scale successively weighs the packages and computes the total cost of each package. A label printer receives the weight and cost data for each package and prints this information on a label associated with the weighed package. The computer-scale further includes means that responds to each label moving through the printer and being applied to a package, which generates a symbol identifying signal. The commodity-related data, the weight and the cost data form a group of package-related data which is correlated with the label symbol, and the associated group of data including the symbol are transferred to a main or central computer, such as a central store computer. The groups of associated data for the packages are stored, the symbol serving as the address for each group. The apparatus further includes a scanner at a store checkout station for scanning the label and transmitting the symbol to the main computer for retrieving at least some of the data of the associated group, such as the commodity I.D. and the cost. The computer also includes means for retrieving one or all of the groups of data for analysis by management.

BRIEF DESCRIPTION OF THE DRAWINGS

The foregoing and other objects and advantages of the present invention will be better understood from the following detailed description taken in conjunction with the accompanying figures of the drawings, wherein:

FIG. 1 is a diagrammatic view of a system incorporating the invention;

FIG. 2 is a flow diagram showing a method of practising the invention;

FIG. 3 illustrates labels for use in practising the invention;

FIG. 4 illustrates an alternative system incorporating the invention; and

FIG. 5 illustrates a package having labels thereon in accordance with the system of FIG. 4.

DESCRIPTION OF THE PREFERRED EMBODIMENT

With reference to FIG. 1, a system embodying the invention includes a computer scale 10 of the type commonly used in the meat departments of large supermarkets. The components include a scale 11, a price calculator or computer 12, a label printer 13, and means 14 for manually entering data into the computer scale. Such a scale normally also includes a switch 16 which is actuated to initiate a package weight reading and to transmit the reading to the price computer 12 and to the label printer 13. A data buss 15 connects the various components of the computer scale 10. The price computer 12 receives a price per pound signal from the data entry unit 14 and a weight reading from the scale 11 for each package, computes the total cost of the package, and feeds the total cost figure to the label printer 13. The label printer 13 is preferably an alpha-numeric type which does not require print slugs or plates for operation. For example, a dot-matrix type of printer is suitable for use in the system. A strip 17 of labels is fed past the label printer 13 and the variable package data are printed on them, as will be described in more detail in connection with FIG. 3 which also shows the labels.

The data entry unit 14 may have a conventional construction. For example, it may comprise an IBM Model 357 data entry device which includes a plurality of manually operated slide switches, each of which is settable to ten positions representing ten digits. This Model 357 includes other data entry means, such as a punched card and badge reader. After data are entered by setting the switches and insertion of the badge and cord, the data are transmitted to a computer memory or to a computer. Another example is illustrated in the drawings and includes a keyboard entry type device designed to receive manually entered commodity-related data. In the specific example illustrated and described herein, the data entry unit 14 includes an alpha-numeric keyboard including a plurality of number keys or switches 21 for the numbers from 0 through 9, and conventional decoding circuits for converting the entered numbers to a form suitable for entry in a store computer 43. The keyboard also includes an "enter" button 22 and a "ready" button 23, the enter button 22 being manually pressed after each data entry on the keys 21 and the ready button 23 being pressed after all of the data have been entered and the system is ready for operation. The data entry unit 14 further includes a plurality of specific data identification keys or switches 24, each of the keys 24 being associated with a particular piece of variable data, such as price per pound, a carcass identification number, operator I.D., etc. as shown in FIG. 1. The data are coded in the form of numbers, and prior to running or processing a particular commodity, such as a type of meat, to enter a piece of data the operator presses the appropriate key 24, enters the data number using the keyboard 21, and then presses the enter button 22 before pressing the next key 24 and entering the next piece of data. As mentioned previously, after all of the data are entered in the unit 14, the operator presses the ready button 23 and then processes the particular commodity. All of the data entered in the unit 14 are stored in a data acquisition and transmission part 26 which makes the entered data available to the computer scale and to the central computer 43.

While much of the variable data may be manually entered as described, some of the data may be automatically fed into the part 23. For example, the computer scale 10 may include an automatic tare feature, and tare may be measured and fed into the part 26 at the start of a run. Further, each commodity may be associated with a store code number, and a variety of commodity data may be contained in the central store computer memory. This data may include commodity I.D., price, tare, etc., and by simply entering the code number in the keyboard of the unit 14, this data may be automatically withdrawn from the computer memory and transmitted to the unit 26.

With specific reference to FIGS. 1 and 3, the strip 17 includes a plurality of labels 31*a* and 31*b* which, as supplied, are attached together along shear or separation lines 32. Each label is preprinted with the store name 33 (FIG. 3) and headings 34 for the variable data to be printed. In accordance with the present invention, each of the labels further has preprinted thereon a non-repetitive symbol 36 in code form. In a preferred example, the code symbols 36 on the labels comprise sequential numbers and it is preferred that a human readable equivalent number 37 also be printed adjacent the code number 36. The numeral 31*a* indicates blank labels before passing the printer 13 and the numeral 31*b* indicates labels after the variable data have been printed thereon. The label printer 13 further includes a severing mechanism, such as a shear 41 (FIG. 1), which separates each label from the strip 17 after printing.

The system further includes means that responds to each label in or moving through the printer 13, and generates a signal that identifies the code symbols 36. Such means may take various forms. Where the symbols 36 represent sequential numbers, such means may comprise a device that responds to the movement of each label through the printer or to the printing of data, and generates an identifying signal for each label. Once set to generate a signal identifying a symbol of a given label, the device automatically advances to the subsequent numbers in step with the movement of the labels through the printer. A simpler arrangement is illustrated in the drawings and comprises a reader or scanner 28 that reads the symbols 36. At substantially the time that each label is printed, the scanner 28 reads the symbol 36 on the label and generates a signal identifying the symbol, the signal being transmitted to the part 26.

Thus, after the weighing cell 11 has weighed an article and the switch 16 has been actuated, the label printer 13 receives the computed total price, the price per pound figure and the weight figure and prints this data on a label, and this information is also fed to the data acquisition part 26. The scanner 28 reads the code symbol 36 on the label being printed, and this information is also fed to the data acquisition part 26. The symbol thus read is related or associated with the group of package-related data received from the computer 12, the scale 11 and the manually entered data in the unit 14, all of the data forming a group of package-associated or related data that has as its address the code symbol on the label associated with the particular package.

This group of associated data including the code symbol is transmitted on a line 42 to a memory contained in, for example, the central store computer 43. Therefore, as a series of packages are processed and labeled, the groups of data, each group being identified by a specific code symbol, are fed to the central memory bank and stored for future use. The store computer 43 preferably includes a conventional data withdrawal unit 44 of the type used in stores for inventory control, which retrieves the data from the central computer 43 for analysis purposes by management.

In a typical supermarket operation, after a package of meat has been weighed and labeled, the package is placed in the fresh meat counter where it is later selected by a customer. The supermarket includes a checkout station 51 which normally includes a code scanner 52 and means for printing a receipt that is given to the supermarket customer after payment for the articles purchased. The clerk at the checkout station 51 passes each article past the scanner 52 which reads the code symbol 36 printed on the label, and the symbol is transmitted to the central store computer 43. In the case of the packages having the labels 31*b* thereon, the computer 43 has all of the data related to each package, and receipt by the computer 43 of the scanned symbol results in the total cost figure being retrieved from the computer 43 and fed to the receipt printer at the checkout station 51. The checkout station 51 preferably also includes a clock, and the time and data of purchase are transmitted to and stored in the store computer 43, and become part of the group of associated data for the package. In this manner, the data of packaging and the date of sale are both available for analysis.

The store computer 43 preferably also includes a manual entry keyboard 53 of a data terminal which enables a computer operator to enter a code symbol in order to modify or cancel the data associated with that symbol. For example, if a particular package is damaged, the label on the damaged package may be removed and the commodity repackaged, and by entering the UPC symbol in the keyboard 53 the data associated with the symbol may be canceled from the memory of the computer 43. If the price of a package is to be changed, the change may also be made through the keyboard 53.

FIG. 2 illustrates the steps in a method of practising the invention. A strip of labels is preprinted with the nonrepetitive symbols at the step 60. The strip of labels is placed in the label printer 13, and, at step 61 a group of data associated with the commodity to be processed is entered, the data being entered manually and/or automatically as previously described. After the data have been entered, the operator precedes with a series of weighing operations by feeding the packages across the weighing pan of the scale 11 and actuating the switch 16 at the completion of each weighing operation. The weighing operation takes place at the step 62 and at step 63 the total cost of each package is computed, based on the weight and on the price per pound and the tare value entered at the step 61. The computed and entered information is sent to the printer and printed on the label at the step 64, and the system responds to the label and the symbol thereon, and generates an identifying signal. At approximately the time of printing, the group of data is passed to the computer memory at the step 66 for temporary storage. After a package has been selected by a customer and given to a clerk at a checkout station, the symbol on the package is scanned at the step 67 which causes the commodity I.D. and the total cost figure for the package to be passed from the computer 43 to the checkout station cash register, where a receipt is printed at the step 68. The cash register at the checkout station, of course, also totals the cost of all of the customer's purchases and the clerk presents the receipt to the customer for payment. At the step 69, the package-related data stored in the computer memory are retrieved and analyzed to promote more efficient store operation.

All of the components of the system may be conventional and commercially available types. The weighing cell 11 and the computer 12 may be of the character described in U.S. Pat. Nos. 3,712,395, 3,766,472. The printer 13 may be a commercially available dot-matrix type, and the reader 28 may also be a commercial UPC bar code reader. The data entry unit 14 is preferably an alpha-numeric keyboard type. The computer components 43, 44 and 53 may be parts of a prior art central store computer and the checkout station components 51 and 52 may also be of the character found in supermarkets in the United States.

While the system has been described in connection with a meat weighing operation, it should be understood that it may also be useful with other types of commodities.

It will be apparent from the foregoing that a novel and advantageous system has been provided. Through the use of the present system, the need for an expensive code printer at each weighing or processing station is avoided. Therefore, for a modest cost the preprinted labels may be of a high quality so that the code symbols are readily and accurately readable. The amount of package-related data that may be stored is relatively large, thereby promoting efficient store management. Still further, the package-related data are transmitted to the computer as soon as the package is wrapped and is immediately available for analysis. This is in contrast to prior art systems using a UPC symbol, wherein the data are not fed to the computer until the package passes the checkout station.

While in the specific example of the invention described herein the label printer 13 prints the variable data on the label containing the code symbol 36, the invention is also broad enough to include an arrangement where the code symbol is on one label and the variable data is contained on a separate label. Such an arrangement requires two labels on each package, but such an arrangement would otherwise be the same as the preferred form described herein. The two labels may be applied to a package by hand, by separate label applicators, or by a single label applicator.

FIGS. 4 and 5 show a specific example of a two-label system as discussed in the preceding paragraph. With reference to FIG. 4, a transfer & labeling machine (T & L) 75 moves a series of articles 76, such as packages of a commodity, across the pan 77 of a computer scale 78. The scale 78 includes a data entry unit 79 similar to the unit 14 where commodity related data are entered. The scale weighs each article 76, and the weight reading plus other data are transmitted to a label printer 81 which prints this information in human readable form on a label 82. A label transfer mechanism 83 then removes the printed label from the printer and applies it to the associated article. The label containing the human readable data is normally placed on the top side of the article so that it is easily viewed by a prospective purchaser.

A U.P.C. label supply unit 86 is also provided, which supplies a series of labels 87 having nonrepetitive numbers or symbols in U.P.C. machine readable form thereon. The unit 86 may include a printer for printing the U.P.C. symbols, or it may contain a supply of labels having the U.P.C. symbols preprinted thereon. The supply unit 86 issues a label 87 for each article 76 passing the printer 81, and another label transfer mechanism 88 picks up each label 87 and transfers it to the associated article 76. Thus, as shown in FIG. 5, each article 76 has two labels thereon, a label 82 having human readable data printed on it by the printer 81 and a second label 87 having the machine readable symbol thereon.

Also provided is a U.P.C. reader 91 which is located to scan the U.P.C. labels 87 on the articles 76. The symbol read by the reader 91 is transmitted to a store computer 92 which is also connected by lines 93 to receive the commodity data from the entry unit 79 and the weight and total cost information from the scale 78. The computer 92 includes a memory bank which stores the data associated with the U.P.C. symbol on each article, similar to the operation of the computer 43 shown in FIG. 1. The store may also include a checkout station 93 connected to the store computer 92, the checkout station 93 including a reader or scanner for the U.P.C. labels 87 on the articles. As previously described, when a label 87 is scanned, the data stored in the computer 92 for the article associated with the scanned label is retrieved and is available at the checkout station for printing on a receipt.

Thus, each article has the customary human readable label 82 thereon and a label 87 containing the U.P.C. identifying number or symbol. The label 82 is normally placed on top of the article so that it can be viewed by a purchaser and the U.P.C. label 87 may be placed on the bottom or on the top of the article. The U.P.C. label could also be placed over an area of the human readable label 82. If desired, the U.P.C. labels 87 could be attached to the human readable labels 82 within the printer 87 or prior to the time that the labels 82 are loaded in the printer 81.

I claim:

1. The method of processing a series of packages utilizing a plurality of labels having nonrepetitive machine readable symbols thereon, a computer-scale, a central computer, and a symbol scanner, comprising the steps of entering a plurality of package-related data, including the price, in the computer-scale, consecutively weighing said packages and for each package computing the total cost and printing at least the package cost and weight on a label associated with the package, responding to the package associated label and generating a signal identifying said symbol on said label, said plurality of data, said weight, said total cost and said identifying signal forming a group of package-related data, transmitting said group of package-related data to the central computer and storing said data in said central computer, and scanning said symbol and retrieving said total cost from said group of package-related data.

2. The method of claim 1, and further including the step of retrieving all of said groups of package-related data and analyzing groups of said data for said series of packages.

3. The method of claim 1, and further including the step of printing said plurality of labels with nonrepetitive machine readable and human readable symbols.

4. The method of claim 1, wherein the symbol scanner is at a checkout station, and further including the step of printing a receipt utilizing said retrieved total cost.

5. The method of claim 1, wherein said identifying signal is generated by reading said symbol on said label.

6. The method of processing a package utilizing a label having a machine readable symbol thereon, a computer scale, a central computer, and a symbol scanner, comprising the steps of entering a plurality of package-related data including the price in the computer scale, weighing said package and computing the total cost and printing at least the package cost and weight on said label, reading the symbol on said label, said plurality of data, said weight, said total cost and said reading forming a group of package-associated data, transmitting said group of package-associated data to the central computer and storing said data in said central computer, and scanning said symbol and retrieving said total cost from said group of package-associated data.

7. The method of claim 6, and further including the step of retrieving said group of package-associated data for analysis.

8. The method of processing a plurality of random weight packages in a supermarket utilizing a series of labels having nonrepetitive machine readable symbols thereon, a computer-scale having a data entry unit, a central computer, and a symbol scanner at a checkout station, comprising the steps of entering package-related data into said entry unit including the price per unit weight, serially weighing said packages and for each package computing the total cost and printing said cost on an associated label, reading said symbol on said associated label, said entered package-related data, said weight, said total cost and said symbol reading forming a group of package-associated data, transmitting said groups for said plurality of packages to said central computer, and scanning said symbol on at least some of said labels as said packages pass said checkout station.

9. Apparatus for processing a series of packages utilizing a plurality of labels having nonrepetitive machine readable symbols thereon, comprising a computer scale, a central computer, and a symbol scanner, means for entering a plurality of package-related data including the price in said computer scale, said computer scale including means for consecutively weighing said packages and for each package computing the total cost and printing at least the package cost and weight on a label associated with the package, means generating a signal identifying said symbol on said label, said plurality of data, said weight, said total cost and said identifying symbol forming a group of package-related data, means transmitting said group to the central computer and storing said data in said central computer, and said symbol scanner scanning said symbol and retrieving said total cost from said group of package-related data.

10. Apparatus as in claim 9, and further including means for retrieving all of said groups of package-related data and analyzing said groups of said data for said series of packages.

11. Apparatus as in claim 9, and further including means for printing said plurality of labels with nonrepetitive machine readable and human readable symbols.

12. Apparatus as in claim 9, wherein the symbol scanner is at a checkout station, and further including means for printing a receipt utilizing said retrieved total cost.

13. Apparatus as in claim 9, wherein said means generating a signal comprises a scanner for reading said symbol.

14. Apparatus for use in processing a series of packages and label means adapted to have human readable data printed thereon and having nonrepetitive machine readable symbols preprinted thereon, comprising a computer scale, a central computer, and a symbol scanner, means for entering a plurality of package-related data including the price in said computer scale, said computer scale including means for consecutively weighing said packages and for each package computing the total cost and printing at least the package cost and weight on a label means associated with the package, means for generating a signal identifying said symbol on said label means associated with said package, said plurality of data, said weight, said total cost and said identifying symbol forming a group of package-related data, means transmitting said group to the central computer and storing said data in said central computer, and said symbol scanner scanning said symbol and retrieving said total cost from said group of package-related data.

15. Apparatus as in claim 14, wherein said label means for each package includes a label having said symbol thereon, and said printing means of said computer scale printing on said label containing said symbol.

16. Apparatus for processing a plurality of random weight packages in a supermarket utilizing a series of labels having nonrepetitive machine readable symbols thereon, comprising a computer scale having a data entry unit, a central computer, and a symbol scanner at a checkout station, means for entering package-related data into said entry unit including the price per unit weight, said computer scale including means for serially weighing said packages and for each package computing the total cost and printing said cost on an associated label, means adjacent said printer for reading said symbol on said associated label, said entered package-related data, said weight, said total cost and said symbol reading forming a group of package associated data, means for transmitting said groups for said plurality of packages to said central computer, and said scanner scanning said symbol on at least some of said labels as said packages pass said checkout station.

17. The method of processing a series of packages utilizing label means adapted to have human readable data printed thereon and having nonrepetitive machine readable symbols thereon, a computer-scale, a central computer, and a symbol scanner, comprising the steps of entering a plurality of package-related data, including the price, in the computer-scale, consecutively weighing said packages and for each package computing the total cost and printing at least the package cost and weight on label means associated with the package, generating a signal identifying said symbol on said label means associated with said package, said plurality of data, said weight, said total cost and said identifying signal forming a group of package-related data, transmitting said group of package-related data to the central computer and storing said data in said central computer, and scanning said symbol and retrieving said total cost from said group of package-related data.

18. The method of processing one or more packages utilizing a computer scale and memory means, comprising the steps of:
   (a) entering package-related data including the price in said computer scale,
   (b) weighing said package and computing the total cost of the package,
   (c) printing a first label with package-related data including said total cost,
   (d) applying said first label to said package,
   (e) applying a second label to said package, said second label including a machine-readable symbol thereon,
   (f) and transmitting said symbol and said package-related data to said memory means for storage.

19. The method according to claim 18, and further including the step of machine reading said symbol on said second label and utilizing said reading to retrieve at least part of said package-related data.

20. Apparatus for processing one or more packages comprising a computer scale, memory means, means for entering package-related data including the price in said computer scale, said scale including means for weighing said package and computing the total cost of the package, means for printing a first label with package-related data including said total cost, means for applying said first label to said package, means for applying a second label to said package, said second label including a machine-readable symbol thereon, and means for transmitting said symbol and said package-related data to said memory means for storage.

* * * * *